April 25, 1939.  A. J. BERG ET AL  2,155,395
METHOD OF MAKING A HEAT EXCHANGING ELEMENT
Filed Aug. 4, 1937
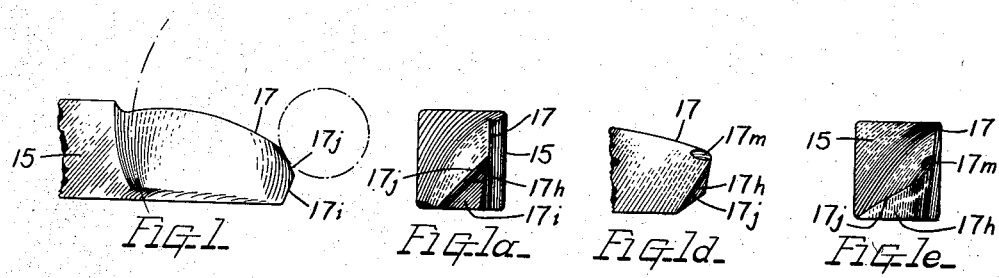
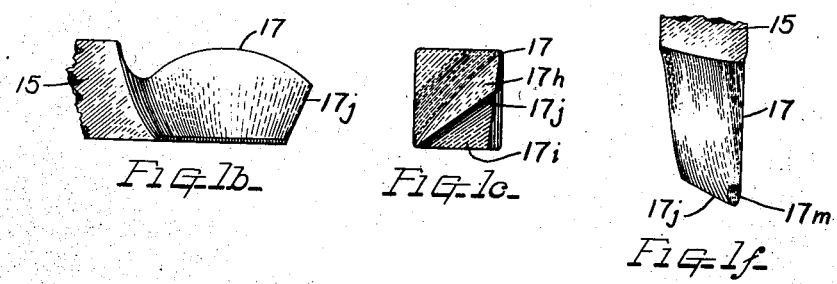
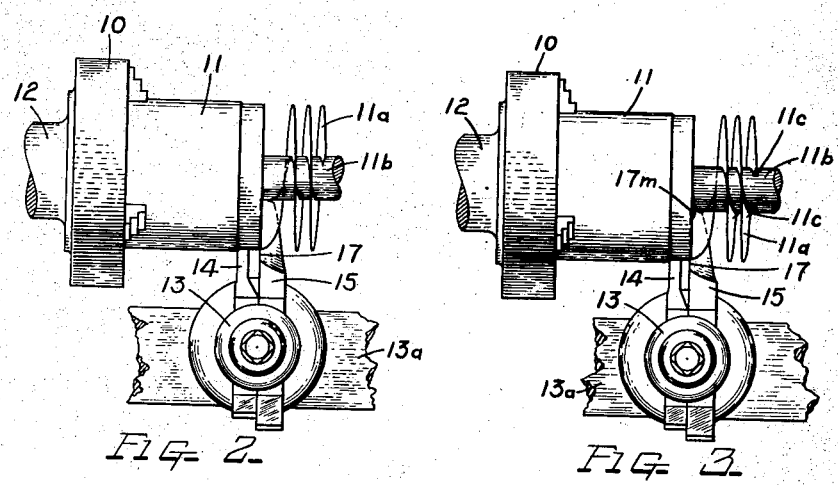
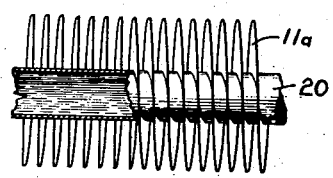
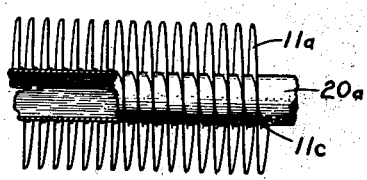
INVENTOR
ALFRED J. BERG
BY JOHN O. HUSE
ATTORNEY Patented Apr. 25, 1939

2,155,395

UNITED STATES PATENT OFFICE 2,155,395

METHOD OF MAKING A HEAT EXCHANGING ELEMENT

Alfred J. Berg, Portsmouth, N. H., and John O. Huse, United States Navy

Application August 4, 1937, Serial No. 157,379

5 Claims. (Cl. 29—157.3)

(Granted under the act of March 3, 1883, as amended April 30, 1928; 370 O. G. 757)

Our present invention relates to a new and useful heat or cold exchanging element and method of making the same, which element may be otherwise usefully employed.

This invention is a continuation in part of and an improvement upon our application, Serial No. 63,894, series of 1935, entitled "Heat exchanging element and process of making the same," filed February 14, 1936, as well as upon our like-entitled application, Serial No. 63,897, series of 1935, filed February 14, 1936, and in application No. 157,378 filed herewith. In all of said filed applications the ribs or fins of heat exchanging elements are machined or cut as a shaving from one end of a tubular bar of metal the size of whose opening substantially conforms to the opening through the fin shaved from said bar, while the outside dimension of said tubular bar conforms to the outside dimension of the shaved helical fin. In the first and last enumerated of said applications a helical heat exchanger rib or fin is cut by different method and means from the end of a bar. Our present invention substantially improves the shaved helical fin as well as cheapens its production, increases the length of the helical shaved fin that may be severed without breakage, dispenses with the necessity of shaving the helical fin from a tubular bar by cutting the same from a solid bar of metal simultaneously with the shaving or machining of the inner and outer edges of the helical shaved fin strip to a uniform width of fin or rib, in which operation a solid central bar of metal is formed with a machined exterior surface which substantially vibrationlessly supports the portion of the helical fin which has been severed from the original bar, and which central smaller bar may be used for other purposes after the originally larger bar has been worked up into two products, one of which is the helical fin and the other of which being the central smaller bar which supports and enables a much longer helical fin to be severed without breakage from the larger bar.

Other objects and accomplishments of our present invention will more fully appear in the specification.

In the drawing, Fig. 1 is a side elevation view of one form of cutter which we have advantageously employed in the attainment of the objects and advantages of our present invention;

Fig. 1a is an end view of the tool shown in Fig. 1;

Fig. 1b is a side elevation view of a somewhat different cutter which we have advantageously employed in the attainment of the objects and advantages of our present invention;

Fig. 1c is an end view of the tool shown in Fig. 1b;

Fig. 1d is a perspective view of the tip portion of an improvement upon either of the cutting tools shown in Figs. 1 or 1b;

Fig. 1e is a tip end view of the tool shown in Fig. 1d;

Fig. 2 is a top plan view of a bar of metal mounted in a lathe or similar turning machine tool provided with a turning tool similar to either Figs. 1 or 1b; and, Fig. 3 is a view similar to Fig. 2 but showing the turning tool of either Figs. 1 or 1b made in accordance with Fig. 1d and producing a helical shaved fin whose inner edge extends laterally from the plane occupied by the remainder of the helical fin;

Fig. 4 is a plan view in partial cross-section of a portion of a heat exchanger tube or element made in accordance with our present invention with its fin or rib as formed in accordance with Fig. 2.

Fig. 5 is a view similar to Fig. 4 but showing its rib or fin as made in accordance with Fig. 3; and Fig. 6 is an enlarged cross-sectional view of a rib as made in accordance with Fig. 3.

In the drawing, in which like characters of reference denote the same parts, 10 diagrammatically represents the chuck of a lathe or other turning tool adapted to rigidly hold a relatively long bar 11 of solid metal concentric with spindle 12, Fig. 2 of the lathe or like machine tool. 13 represents the tool post portion of the usual carriage 13a of the machine tool which is advanced longitudinally of the bar 11 by the usual screw feed which is so well known that it need not be illustrated. The tool post 13 is bifurcated to receive the shanks of cutting tools 14 and 15 which are secured in said bifurcation by the screw 16. The turning tool 14 is the ordinary tool usually employed to true up the periphery of a cylinder; while the cutting tool 15 is the tool illustrated in Figs. 1b, 1c or in 1d, 1e, 1f of the drawings of our last stated previously filed application, with the exception of the tip of the cutter. This tip, in our last stated previously filed application, projects into the hollow bore of the tubular bar of metal from which the helical fin is shaved or turned, and consequently such tip is required to perform no function other than to insure the complete severance of the helical fin from the tubular bar. The shearing edge 17 of the cutter 15 terminates at the outer cutting end of the tool 15 in a surface 17h which, when in use, extends approximately at a tangent to the inner diameter of the helical fin strip. The surface 17h may extend to the bottom of the tool, or it may extend only a portion of such distance, as in Figs. 1, 1a, with the lower portion of such distance comprising a surface 17i extending from the lower end of the surface 17h thence downwardly and toward the opposite end of the tool 15 to afford a more pronounced clearance for the surface 17h. The shearing edge 17, which forms the lateral surfaces of the helical fin severed from the bar 11, intersects at the outer end of the tool 15 with a shearing edge 17j coinciding with the hypotenuse of the angular surface comprising the surface 17h. This shearing edge 17j is formed by the grinding of the surface 17h upon the end of the tool 15 at greater than a right angle from said edge 17j. In the making of the helical fin the shearing edge 17 of the tool 15 cleaves the lateral surfaces of the helical rib or fin 11a from the solid metal of the solid bar 11 while the shearing edge 17j shears the inner edge of the fin or rib 11a from the bar 11 and leaves the rigid central bar 11b, whose outer diameter is turned to a uniform diameter by the shearing edge of the cutting tool 14, coincident with the separation from the bar 11 of the rib or fin 11a. As the helical rib or fin 11a is separated from the bar of metal 11, the inner edge of the separated helices of the strip of the rib or fin 11a are supported by the central bar 11b, which is all that remains of the original bar 11 after the helical rib or fin 11a has been severed therefrom.

In the turning of the helical rib or fin, in accordance with the first and last of the previously stated applications for Letters Patent, the major problem was to obtain the shaving as long as possible by avoiding the breakage thereof. While satisfactory results were obtained by a very substantial length of shaved helical fin being produced before the same broke, we have found that the vibration of the unsupported helical fin being rapidly turned about its longitudinal axis in the severing of the helical fin from the tubular bar of metal substantially contributed to the breakage of the helical rib or fin into shorter lengths than could be made from the total length of the bar 11. In solving this problem applicants have heretofore provided the usual lathe or turning machine tool with a rod or tube to receive therein the helical cut fin immediately after it was severed from the bar and hold the severed fin concentric with the bar from which it was severed as well as substantially free from vibration. For the same purpose we have also heretofore provided such machine tools with a rod at least whose adjacent end was mounted concentric with the bar of metal from which the helical fin was being removed. The removed helical fin would surround this rod which would revolvably hold the severed helical fin substantially free from vibration which would tend to break the same. By these practices we have heretofore obtained substantially longer helical fins than was theretofore producible. However, the tube or rod attachment to or association with the usual turning machine tool was unfamiliar practice and objectionable to those required to use such tools in the production of the shaved helical rib or fin. Furthermore, the frictional engagement of the outer or the inner diameters of the severed helical fin respectively with such tube or rod tended to objectionable lack of uniformity in the diameters as well as concentricity of the respective helices of the helical shaved fin or rib.

The present solution of this problem dispenses with the necessity of employing said tube or bar. The central bar 11b, which is rigid with the unshaved or unturned portion of the main bar 11, not only vibrationlessly supports the helices of the helical ribs or fins 11a separated from the bar 11, but also said bar 11b turns concentrically with the severed portion of the helical rib or fin 11a so that there is not even frictional disturbance between the rigid bar 11b and the separated portion of the helical fin 11a. By reason of this vibrationless as well as frictionless support of the severed portion of the helical fin or rib 11a we have been able to produce a substantially longer severed helical fin than has been heretofore possible commercially. Furthermore, the same is produced in a manner which adds no extraneous tube or rod to the turning machine, and we obtain the shaved fin with greater facility and without inconvenience to those customarily operating such machines. Further than this, the bar 11b may be conveniently kept associated with the sheared helical fin until the same is removed and placed upon heat or cold exchanging tube or member 20, after which the solid bar 11b may be employed for other commercial purposes, for many of which the same is more desirable by reason of its turned exterior surface as distinguished from the drawn or rolled surface heretofore usual in such bars of metal.

These helical fins or ribs 11a are associated with the heat or cold exchanging tube or member 20 of Fig. 2 in any desirable or convenient manner in accordance with the joint or several previous inventions of applicants or either of them.

As shown in Fig. 2 the cutting tool 14 is mounted in the tool post 13 substantially parallel with and on one side of the cutting or turning tool 15. The outer end of tool 14 is provided with a cutting edge which turns true and concentric the outer surface of the bar 11, so that the width of the metal comprising the helices of the helical rib or fin 11a is uniform and that its exterior and interior diameters are concentric when and as severed from the bar 11, and are so maintained throughout their association with the bar 11b because the helical ribs or fins 11a are subjected to no stress relative to the bar 11b.

In Fig. 1d the bevelled side of cutter 15 at a point comprising the junction of cutting edges 17 and 17j is provided with a more bluntly bevelled recess 17m, Figs. 1d and 1e. This recess results in the lateral projection of the inner edge of the helical rib or fin 11a. This lateral projection, 11c, Fig. 3, is of substantially the same thickness of metal as the remaining portions of the rib or fin 11a. The lateral projection 11c is formed progressively by the like progression between the tapering surfaces of the turning tool 15 forming the cutting edge 17 and the terminal bevel 17m at the outer point of the tool 15, which terminal bevel forms the upper portion of shearing edge 17j in the tool illustrated in Figs. 1d and 1e.

The helical fin 11a produced in accordance with the tool heretofore described and illustrated in Figs. 1d, 1e and 1f may be secured about or otherwise associated with the heat or cold exchanging tube 20a in accordance with any of the heretofore joint or several inventions of the applicants or in any other convenient or desirable manner as generally indicated in Fig. 4.

The shearing edge 17j of Figs. 1a, 1c and 1e which simultaneously forms the inner turned bore of the helical fin as well as the exterior turned surface of the supporting core bar 11b, extends longitudinally outward from the bar 11 in the direction in which the helical rib is projected upon its progressive severance from the solid bar. Such cutting edge or edges 17, 17j occasion a substantial shearing cut which results in a substantial angular flowage of portions of the metal at the severed inner metal of the severed inner surface forming the bore of the helical fin. Such flowage affords a substantial cold working of the inner edge of the helical rib or fin which engages the outer periphery of the heat exchanging tube or member 20 and affords increased heat exchanging capacity due to such cold working. The cold working effect of the cutting edges 17 of the cutter 15 is stated in the first and last of the hereinbefore stated of our applications to which reference may be had to the structure and functions of said cutting edges 17 with the same efficiency as if the same were written at length herein.

The recess 17m in the tip of cutting tool 15 inherently increases the bluntness of the beveled side of such tool as it recedes from the shearing edge 17, which edge 17 continues in a straight line, as shown more clearly in Figs. 1e and 1f. As the shearing edges 17, 17j of tool 15 separate the lateral and inner surfaces of helical rib or fin 11b from bar 11 and its resulting central portion 11b that the metal comprising all but the inner edge of rib or fin 11b flows over the straight beveled side of tool 15 which forms such portions of rib or fin 11b flat, while the inner edge of rib or fin 11b flows down into and then out of the side of said recess 17m and results in the formation of the curved lateral projection 11c, Figs. 3, 5 and 6. Such projection 11c greatly increases the strength and freedom from deformation of the rib or fin 11b as well as magnifies the area of its heat exchange contact with the element 20a, while the cold working manner of the formation of said projection 11c increases the density of its constituent metal with its attendant increase in its rate of heat exchange and increases said strength and freedom. Such projection 11c may grip the outer surface of the element 20a when the same is substantially circular and afford sufficient securement thereto or facilitate such securement. This construction of the rib or fin 11b enables thinner metal to be used therein of practically any desired height above the element 20 upon which they may be mounted without impairing the strength and stability of the rib or fin. This also enables a greater number of ribs or fins to be used per unit of length of said element 20, and greatly decreases the weight and cost of a heat exchanger of any given heat exchanging capacity.

In the production of the rib or fin 11a according to our invention, as heretofore explained, other than made by cutter 14, the rib or fin 11b is the only cutting from the bar 11 since no shaving or shavings are necessary other than the rib or fin 11b.

In turning the helices of the helical rib or fin 11a from a tubular bar of metal, when the external and internal diameters of such helices are unmachined, the different helices are not invariably concentric. This occasions some production problems where pressure is desired to be applied to the edge of the outer periphery of the helices, and/or where a physical uniform continuous contact is re-required between the tube or body 20 and the inner edge of the rib or fin and a continuously uniform space is desired about the outer edge of said rib or fin. We have overcome such production problems by, simultaneously with the production of the rib or fin, turning the interior and exterior diameters of the helices which also affords greater heat conductive capacity to the rib or fin, as well as therefrom to the tube or body 20. Such turning of the helical rib or fin, including all of its edges, also dispenses with the multiple production problems of making the rib or fin of a flat metal strip bent edgewise into helices or by precoiling in part or in whole before being applied about the body 20 in which such bending could not be accomplished even with copper strips of a width substantially in excess of one-half of the diameter of the tube or body 20 without precoiling and such precoiling has not enabled such width to exceed five-eighths or three-quarters of the diameter of the tube or body 20. With our invention we have so far encountered no substantial rib or fin production problem where the width of the helices did not exceed one or one and one-half times the diameter of the tube or body portion.

This invention may be made and used by or for the Government of the United States for governmental purposes without the payment of any royalty thereon or therefor.

Having now so fully described our invention that others may therefrom make and use the same, what we claim is:—

1. The method of making an apertured helical heat exchange fin, comprising progressively cutting a bar of heat conductive metal continuously at its end and in the direction of its length to a depth that leaves an uncut portion of the bar to directly form by the cutting operation an apertured helical heat exchange fin, simultaneously as a part of the aforesaid cutting operation severing the fin at its inner periphery from the uncut portion of the bar, and supporting the apertured helical heat exchange fin thereon during the cutting operation.

2. The method of making an apertured helical heat exchange fin, comprising progressively and substantially uniformly cutting a bar of heat conductive metal continuously at its end and in the direction of its length to a depth that leaves an uncut portion of the bar to directly form by the cutting operation an apertured helical heat exchange fin having a substantially uniform thickness throughout and a height equal to many times its thickness, simultaneously as a part of the aforesaid cutting operation severing the fin at its inner periphery from the uncut portion of the bar, and supporting the apertured helical heat exchange fin thereon during the cutting operation.

3. The method of making an apertured helical heat exchange fin, comprising progressively cutting a bar of heat conductive metal continuously at its end and in the direction of its length to a depth that leaves an uncut portion of the bar to directly form by the cutting operation an apertured helical heat exchange fin, simultaneously as a part of the aforesaid cutting operation severing the fin at its inner periphery from the uncut portion of the bar and forming thereat a lateral projection, and supporting the apertured helical heat exchange fin on the aforesaid uncut portion of the bar during the cutting operation.

4. The method of making a heat exchange device including a heat exchange element provided with a helical heat exchange fin secured thereto, comprising progressively cutting a bar of heat conductive metal continuously at its end and in the direction of its length to a depth that leaves an uncut portion of the bar to directly form by the cutting operation an apertured helical heat exchange fin, simultaneously as a part of the aforesaid cutting operation severing the fin at its inner periphery from the uncut portion of the bar, supporting the apertured helical heat exchange fin thereon during the cutting operation, positioning the fin thus formed about a heat exchange element and securing the fin thereto.

5. The method of making a heat exchange device including a heat exchange element provided with a helical heat exchange fin secured thereto, comprising progressively cutting a bar of heat conductive metal continuously at its end and in the direction of its length to a depth that leaves an uncut portion of the bar to directly form by the cutting operation and apertured helical heat exchange fin, simultaneously as a part of the aforesaid cutting operation severing the fin at its inner periphery from the uncut portion of the bar and forming thereat a lateral projection, supporting the apertured helical heat exchange fin on the aforesaid uncut portion of the bar during the cutting operation, positioning the fin thus formed about a heat exchange element with its lateral projection in contact with the surface thereof, and securing the fin thereto.

JOHN O. HUSE.
ALFRED J. BERG.